United States Patent
Endert (10) Patent No.: US 7,947,139 B2
(45) Date of Patent: May 24, 2011

(54) SYSTEMS AND METHODS FOR CREATING TEXTURED LAMINATES

(75) Inventor: Martin Endert, Spartanburg, SC (US)

(73) Assignee: Kings Mountain International, Inc., Kings Mountain, NC (US)

( * ) Notice: Subject to any disclaimer, the term of this patent is extended or adjusted under 35 U.S.C. 154(b) by 38 days.

(21) Appl. No.: 11/957,094

(22) Filed: Dec. 14, 2007

(65) Prior Publication Data
US 2009/0151866 A1 Jun. 18, 2009

(51) Int. Cl.
B32B 37/00 (2006.01)
B32B 38/06 (2006.01)

(52) U.S. Cl. .......... 156/64; 156/219; 156/220; 101/485; 101/DIG. 36; 700/124; 700/125; 33/616

(58) Field of Classification Search .................... 156/63, 156/64, 230, 231, 232, 233, 234, 235, 236, 156/237, 238, 239, 240, 580, 219, 447; 264/219–227, 40.1–40.7; 33/616; 270/52.08; 101/DIG. 36, 426, 485, 481; 700/124, 125
See application file for complete search history.

(56) References Cited

U.S. PATENT DOCUMENTS

| | | | | |
|---|---|---|---|---|
| 1,477,392 A * | 12/1923 | Smith | ............................ | 101/474 |
| 2,390,618 A | 12/1945 | Roehm | | |
| 2,444,863 A * | 7/1948 | Tornberg | ......................... | 427/189 |
| 2,783,172 A * | 2/1957 | Avery | ............................ | 206/447 |
| 2,894,454 A | 7/1959 | Hillier | | |
| 3,462,226 A * | 8/1969 | Huffaker | ........................... | 356/72 |
| 3,487,133 A | 12/1969 | Lindsay | | |
| 4,062,992 A * | 12/1977 | Power et al. | ..................... | 428/90 |
| 4,421,026 A | 12/1983 | McCullion, Jr. | | |
| 4,425,417 A | 1/1984 | Ingalls et al. | | |
| 5,723,221 A | 3/1998 | Brooker | | |
| 5,744,081 A * | 4/1998 | Tanigawa et al. | ............. | 264/219 |
| 6,638,387 B2 | 10/2003 | Cruz | | |
| 7,249,445 B2 | 7/2007 | Thiers | | |
| 2002/0160680 A1 | 10/2002 | Laurence | | |
| 2003/0050163 A1 * | 3/2003 | Smith | ............................ | 493/141 |

(Continued)

FOREIGN PATENT DOCUMENTS
DE 39 17 919 A1 12/1989
(Continued)

OTHER PUBLICATIONS
European Search Report for Application No. 08021355.6-2304, search completed Mar. 26, 2009.
(Continued)

Primary Examiner — Philip C Tucker
Assistant Examiner — William P Bell
(74) Attorney, Agent, or Firm — Moore & Van Allen PLLC; Christopher W. McAvoy; Ryan P. Harris (57) ABSTRACT

Embodiments of the present invention provide an improved and economical system and method for viewing proposed texture designs for textured decorative laminates without having to make a press plate and a sample laminate. Embodiments of the present invention further provide systems and methods for making sample laminates and for registering a sample press plate with the laminate's decorative design when manufacturing a sample laminate. More particularly, embodiments of the present invention utilize transparent sheets, such as acetate films, in novel ways during the design of textured laminate press plates and during the registration of the press plate and the laminate's decorative layer.

28 Claims, 9 Drawing Sheets

U.S. PATENT DOCUMENTS

| | | |
|---|---|---|
| 2003/0108717 A1 | 6/2003 | Sjoberg |
| 2005/0109445 A1* | 5/2005 | Kornfalt et al. .................. 156/64 |
| 2005/0247216 A1* | 11/2005 | Reichwein et al. ............. 101/32 |
| 2007/0079925 A1* | 4/2007 | Hansson et al. .............. 156/219 |

FOREIGN PATENT DOCUMENTS

| | | |
|---|---|---|
| DE | 10 2005 020 456 A1 | 11/2006 |
| EP | 0 172 947 A1 | 3/1986 |
| EP | 1 153 736 A1 | 11/2001 |
| EP | 1 595 718 A1 | 11/2005 |
| GB | 2 047 625 A | 12/1980 |
| JP | 08039669 | 2/1996 |
| WO | WO 02/058924 A1 | 8/2002 |
| WO | WO 2006/136949 A2 | 12/2006 |

OTHER PUBLICATIONS

European Search Report for Application No. 08021354.9-2304, search completed Mar. 27, 2009.

* cited by examiner

SYSTEMS AND METHODS FOR CREATING TEXTURED LAMINATES

FIELD

The invention generally relates to the field of textured decorative laminates, and more particularly, embodiments of the present invention relate to systems and methods for creating the three-dimensional surface design of the textured laminate and aligning the laminate's three-dimensional surface design with the laminate's decorative image.

BACKGROUND

Decorative laminates have been used as surfacing material for many years, in both commercial and residential applications. Decorative laminates can provide an aesthetically pleasing surface that is more economical and/or has improved physical characteristics compared to similar looking alternatives. For example, decorative laminates can be used to create flooring that has the appearance of real hardwood flooring but is less expensive and more durable than real hardwood flooring.

In addition to flooring, decorative laminates are often used in furniture, countertops, cabinets, wall paneling, partitions, fixtures, and the like. As described above, decorative laminates can be made to resemble real wood. Decorative laminates can also be made to resemble such other materials and surfaces as stone, ceramic, marble, concrete, leather, fabric, brick, tile, and the like. In other applications, instead of being made to resemble a particular traditional material or surface, a decorative laminate may be made to provide more fanciful surfaces.

More recently, decorative laminates have been improved to include a three-dimensional "textured" surface. In this way, decorative laminates can be made to not only look like some other material or surface, but can also can be made to feel like the other material or surface. In fact, decorative laminates can be made to so closely resemble the look and feel of other materials that one cannot easily determine whether the surface includes the real materials or is a faux representation of the real materials. For example, a textured decorative laminate made to look like real wood paneling may include a plurality of depressions and/or protrusions on its surface to create a texture that simulates the grains and knots of real wood boards. In another example, the textured decorative laminate may be made to look like a plurality of ceramic tiles separated by grout lines. In such an embodiment, the surface of the laminate may be made so that the images of the grout lines are depressed relative to the images of the ceramic tiles. In still other applications, textured decorative laminates may be made with more fanciful visual artwork and may have embossing and textures that work in conjunction with the visual artwork to create a more interesting and aesthetically pleasing surface.

In general, decorative laminates are classified into two broad categories based on how the laminates are manufactured, namely "high" pressure decorative laminates (HPDLs) and "low" pressure decorative laminates (LPDLs). In general, the industry considers "high" pressure decorative laminates as those laminates that are manufactured or "laminated" under a pressure of generally more than 750 psig. "Low" pressure decorative laminates are typically manufactured at a pressure of about 300 to 600 psig.

HPDLs and LPDLs are often further distinguished by the fact that HPDLs are typically manufactured by first laminating a decorative paper layer with one or more other thin layers and a resin to create a relatively thin and flexible laminate. This thin and flexible laminate is then typically adhered to a thicker, self-supporting substrate layer during a later stage of manufacturing. In contrast, LPDLs are typically manufactured by laminating the decorative paper layer with the self-supporting substrate layer, such as particleboard or MDF, and a resin in a single laminating or "pressing" operation. Generally, the idea is that the higher pressures involved in manufacturing HPDLs will crush the substrate layer beyond that which may be desirable. For this reason, LPDLs are sometimes also referred to as "direct" pressure decorative laminates (DPLDs) since the decorative layer is laminated or "pressed" directly onto the substrate layer in a single step. However, it should be noted that, although manufacturing HPDLs typically involves the two steps described above while manufacturing LPDLs typically involves the one step described above, this is merely a generalization about the typical manufacturing processes used to make the two different types of laminates. In some procedures, an HPDL may be laminated with a self-supporting substrate layer in a single pressing step and a LPDL may be adhered to a substrate layer in more then one step.

Figure 1:
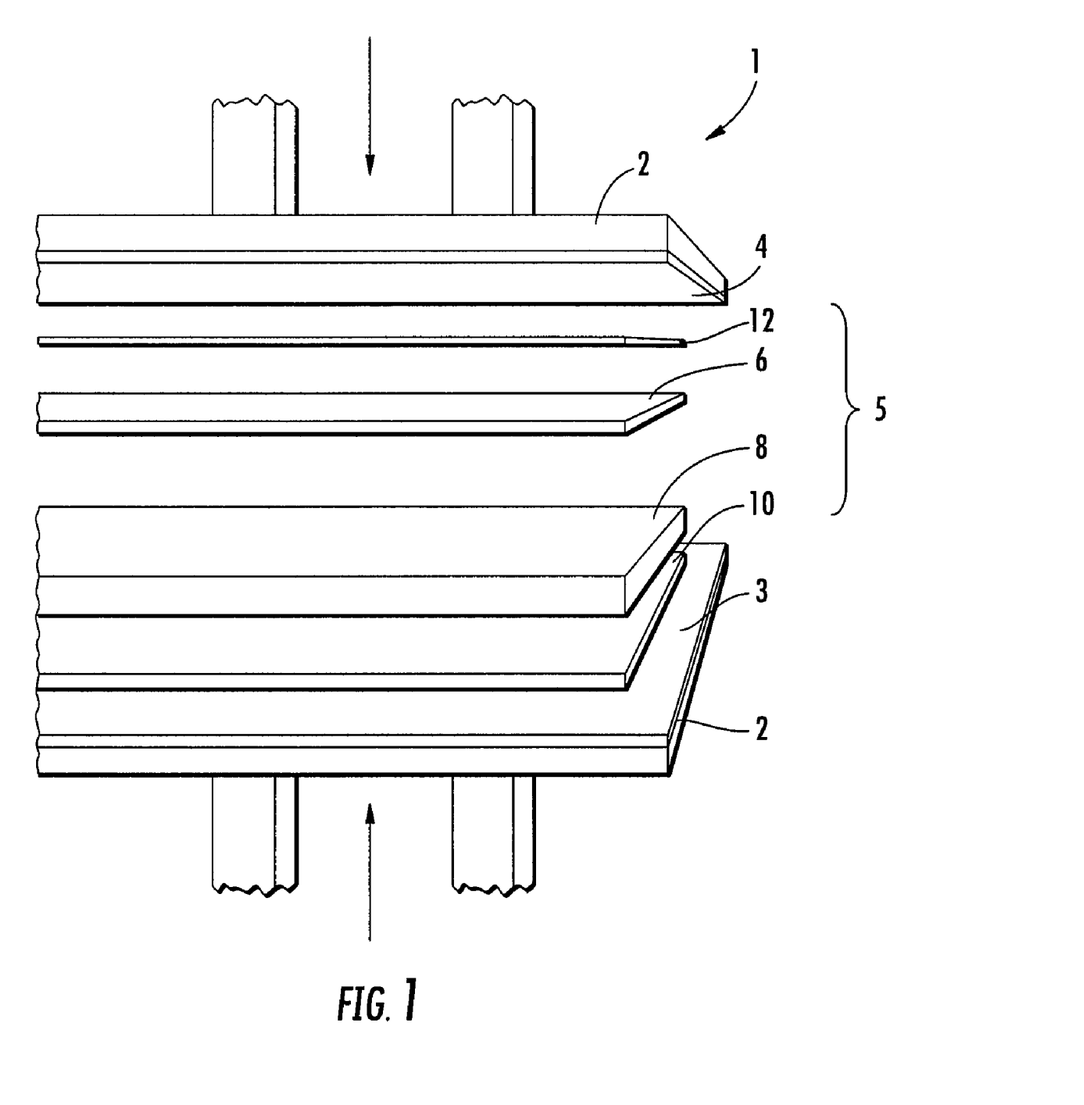
FIG. 1 illustrates an exemplary low pressure decorative laminate and a low pressure press system, such as one that may be used in accordance with embodiments of the present invention.

FIG. 1 illustrates an exemplary LPDL 5 and press system 1, such as one that may be used in accordance with embodiments of the present invention. As illustrated in FIG. 1, the laminate 5 generally comprises a decorative layer 6 and a substrate layer 8. The decorative layer 6 is typically a sheet of paper or similar material having a decorative image or pattern printed thereon. The substrate layer 8 is used to provide structure to the laminate 5 and may comprise, for example, particleboard, high-density fiberboard (HDF), medium-density fiberboard (MDF), or the like. The decorative layer 6 is soaked or otherwise coated with resin, such as a thermosetting melamine formaldehyde resin, and is bonded to the substrate layer 8. In some embodiments, one or more other layers are bonded with the decorative layer 6 and the substrate layer 8. For example, a substantially transparent wear-resistant layer 12 may be bonded over top of the decorative layer 6 to protect the "top" surface of the final laminate. Likewise, a base layer 10 may be bonded to the lower surface of the substrate to protect the "bottom" surface of the final laminate.

As illustrated in FIG. 1, these layers are at least partially coated or saturated with resin and are placed in a press 2 where they are bonded together under heat and pressure. For example, the layers are typically heated to approximately 160 to 220 degrees Celsius and pressed together at approximately 300 to 400 psi for approximately 15 to 20 seconds. The heat cures the thermosetting resin, thereby bonding the layers together. For textured decorative laminates, the upper portion of the press 2 typically has a press plate 4 attached thereto, where the press plate 4 has a plurality of depressions and/or protrusions arranged in a three-dimensional design. When the press plate 4 is pressed into the resin and against the upper surface of the laminate, the resin on the upper surface cures with an imprint of the three-dimensional surface of the press plate therein. The press 2 may also include a lower press plate 3 attached thereto. The lower press plate 3 may have a flat, smooth surface or, in some embodiments, may have a plurality of depressions and/or protrusions arranged in a three-dimensional design so that the lower surface of the laminate is embossed in addition to or as an alternative to the upper surface of the laminate.

Importantly, the textured press plate 4 must be aligned precisely with the decorative layer 6 so that the texture design pressed into the laminate is properly aligned with the decorative image or pattern on the decorative layer 6. If the press plate 4 is even slightly out of register with the decorative layer 6, the resulting laminate may have to be discarded. For example, if the texture pattern is slightly shifted or angled relative to the decorative pattern, a moiré effect can be created resulting in a significantly blurred image or the appearance of undesirable patterns in the laminate. In another example, a feature of the texture design is obviously misaligned with some corresponding feature of the decorative image. For instance, where the decorative image is of a tiled surface, a ridge that is intended to be aligned with the edge of a tile in the decorative image may instead fall in the grout line area or the tile area of the decorative image.

The registration of the press plate and the decorative layer is further complicated by the fact that the metallic press plate expands when heated during the laminating process and the fact that the decorative layer and the substrate layer may also expand based on the specific material properties of each layer. Furthermore, each press may uniquely effect how a press plate will grow based on how the particular press fixes the press plate to the press, e.g., based on the position and spacing of lugs and/or clamps used to secure the press plate to the press.

A system for generating HPDLs may, in some cases, be similar to the LPDL system shown in FIG. 1. The pressures and temperatures, however, will generally be significantly higher in an HPDL system compared to an LPDL system. Although the layering in an HPDL may be different than that of a typical LPDL system, the manufacture of textured HPDLs still generally involves use of a press, a textured press plate, a decorative layer, and a thermosetting polymeric resin.

Typically, the party that manufactures the laminate has another party create the textured press plate(s) used in the manufacturing process. Since press plates must be able to withstand significant and repetitive heat and pressure changes and since press plates must typically have very detailed and precise texture patterns formed of many minuscule depressions and/or ridges in the press plate, the manufacturer of the press plate is typically a company that specializes in the manufacture of precision metal plates. Although the laminate maker, and perhaps the end user of the laminate, generally decide on what will be a suitable texture for the resulting laminate, the press plate manufacturer is also usually involved in the design of the texture since the press plate company typically has significant knowledge of which textures are possible and at what cost different textures can be made. As such, the laminate designer typically must work closely with the press plate manufacturer in order to obtain the desired look and feel of the finished laminate and to determine allowable tolerances in the registration of the press plate and the decorative layer.

Since the design process is usually an iterative one, there needs to be fast and economical ways for the different parties involved in the design process to communicate ideas to one another and to determine how the finished product will appear without having to make full scale press plates and laminates each time a change is made or another idea is tried during the laminate design process.

BRIEF SUMMARY OF EMBODIMENTS OF THE INVENTION

Embodiments of the present invention provide an improved and economical system and method for viewing proposed texture designs for textured decorative laminates without having to make a press plate and a sample laminate. Embodiments of the present invention further provide systems and methods for making sample laminates and for registering a sample press plate with the laminate's decorative design when manufacturing a sample laminate. More particularly, embodiments of the present invention utilize transparent sheets, such as acetate films, in novel ways during the design of textured laminate press plates and during the registration of the press plate and the laminate's decorative layer. Embodiments of the present invention may be used during the creation of press plates for low pressure laminates, high pressure laminates, and/or other laminates and/or during the creation of low pressure laminate samples, high pressure laminate samples, and/or other laminate samples.

For example, embodiments of the present invention provide a device for use during the design and manufacture of a textured decorative laminate, where the device comprises an at least substantially transparent sheet, such as a cellulose acetate sheet, having an image printed thereon. The image printed on the at least substantially transparent sheet comprises a two-dimensional representation of a three-dimensional texture design. The three-dimensional texture design is a design that is to be used to make a three-dimensional surface of a press plate for manufacturing the textured decorative laminate.

In one embodiment of the device, the image printed on the transparent sheet is printed using different colors or different shades of a color to represent different textures used in the three-dimensional texture design. In some embodiments, the image is printed using different colors or different shades of a color to represent variations in the third dimension of the three-dimensional texture design.

Embodiments of the present invention may also provide a system for viewing a proposed texture design for a proposed textured decorative laminate. Such a system may include a first sheet, such as a paper sheet, having a decorative image printed thereon, and a second generally transparent sheet, such as an acetate sheet, having a two-dimensional representation of a proposed three-dimensional texture design printed thereon. The second generally transparent sheet is generally configured such that it can be overlaid over the first sheet allowing a user to view the proposed texture design in conjunction with the decorative image.

In some embodiments of the system, registration marks printed on the first and second sheet are configured to be used to align the second sheet with the first sheet when the second sheet is laid over the first sheet. In some embodiments, the two dimensional representation is printed on the second generally transparent sheet using different colors or different shades of a color to show different elevations, textures, or features in three-dimensional texture design.

In one embodiment of the system, the decorative image includes a wood grain image, and the three-dimensional texture design includes a representation of wood grain texture. In other embodiments, the decorative image includes an image of a tiled surface, and the three-dimensional texture design includes one or more grout line representations depressed relative to one or more tile representations.

In an exemplary embodiment of the system, the two-dimensional representation printed on the transparent sheet is based on the same digital data that will be used to generate a three-dimensional surface on a press plate configured to be used in the manufacture of the proposed textured decorative laminate. In some embodiments, the system further includes a digital image of the decorative design, and a computer configured to execute computer readable code stored on a computer readable medium, wherein the computer readable code instructs the computer to display the digital image and assists a user with development of the proposed three-dimensional texture design in digital form.

Embodiments of the present invention also provide a method of creating a textured decorative laminate. Such a method may include: (i) providing a decorative sheet having a decorative design printed thereon; (ii) providing a press plate having a three-dimensional surface, the three-dimensional surface comprising a plurality of depressions and/or protrusions arranged in a predetermined texture design, wherein the press plate has at least one identifiable feature; (iii) providing a transparent sheet having the predetermined texture design printed thereon in two-dimensions, wherein the transparent sheet has press plate positioning markings thereon showing the location of the at least one identifiable feature of the press plate relative to the predetermined texture design; (iv) positioning the transparent sheet over the decorative sheet such that the predetermined texture design printed on the transparent sheet aligns with the decorative design on the decorative sheet as desired; (v) recording, while the transparent sheet is positioned as desired over the decorative sheet, the location, relative to the decorative sheet, of the press plate positioning markings on the transparent sheet; (vi) removing the transparent sheet from its position over the decorative sheet; (vii) providing resin on and/or around the decorative sheet; and (viii) pressing the press plate against the resin and the decorative sheet such that the at least one identifiable feature of the press plate aligns with the recorded location of the press plate positioning markings relative to the decorative sheet.

In some embodiments of the method, providing a decorative sheet having a decorative design printed thereon includes printing a decorative design on a sheet of paper. In an exemplary embodiment, the step of providing a transparent sheet having the predetermined texture design involves printing the two-dimensional image of the predetermined texture design onto a sheet of acetate. The decorative design may include, for example, an image of a wood, ceramic, tile, stone, and/or brick surface, and the predetermined texture design may include a texture indicative of the wood, ceramic, tile, stone, and/or brick surface.

In some embodiments, the method further involves: providing a digital image of the decorative design; using the digital image of the decorative design to create the predetermined texture design digitally; and using the digital predetermined texture design to generate the three-dimensional surface of the press plate and the two-dimensional image on the transparent sheet.

In an exemplary embodiment of the method, the at least one identifiable feature of the press plate includes at least two circular holes in the press plate located proximate to opposite corners of the press plate. In some instances, the at least two circular holes in the press plate are used to attach the press plate to a press. In such embodiments, the press plate positioning markings on the transparent sheet may include markings indicating the location of the centers of each of the at least two circular holes in the press plate relative to the predetermined texture design. Furthermore, recording the location of the press plate positioning markings relative to the decorative sheet may involve creating markings on the decorative sheet that show the location of the markings on the transparent sheet showing the center of the at least two circular holes. The method may also involve aligning the centers of the at least two circular holes in the press plate with the markings on the decorative sheet showing the center of the at least two circular holes.

In some embodiments of the method, the step of recording the location of the press plate positioning markings relative to the decorative sheet involves creating markings on the decorative sheet that show the location of the press plate positioning markings when the transparent sheet is positioned as desired over the decorative sheet. In some embodiments, the step of pressing the press plate against the resin and the decorative sheet involves pressing the press plate against the resin, the decorative sheet, and a rigid substrate material to form a low-pressure decorative laminate board. The methods of embodiments of the present invention may typically be used to when creating a textured laminate sample where, in some instances, the press plate covers only a portion of the decorative design.

Embodiments of the present invention further provide a system for registering a three-dimensional texture design with a decorative design in a laminate. The system typically includes: (i) a decorative layer of the laminate, the decorative layer having the decorative design printed thereon; (ii) a press plate having a three-dimensional surface, the three-dimensional surface having a plurality of protrusions or depressions arranged in a predetermined texture design, wherein the press plate further comprises at least one identifiable feature fixed relative to the predetermined texture design; (iii) a transparent sheet having a two-dimensional image of the protrusions or depressions in the predetermined texture design printed thereon, wherein the transparent sheet further has press plate positioning markings printed thereon that indicate the location of the at least one identifiable feature of the press plate relative to the predetermined texture design, and wherein the transparent sheet is configured so that it can be placed over the decorative layer such that the decorative image is visible therethrough to allow for the alignment of the two-dimensional texture design printed on the transparent sheet with the decorative design printed on the decorative layer so that, after the transparent layer is aligned with the decorative layer, the locations of the press plate positioning markings relative to the decorative layer can be recorded and available after the transparent sheet is removed from its position over the decorative layer; and (iv) a press for pressing the press plate against the decorative layer, the press configured such that the press plate can be attached to the press in such a way that the at least one identifiable feature of the press plate is aligned with the recorded location of the press plate positioning markings.

Such a system may further include a digital image to be used to print the decorative design onto the decorative layer and to be used to create a digital representation of the texture design. In such an embodiment, the three-dimensional surface of the press plate and the two-dimensional image printed on the transparent sheet may be based on the digital representation of texture design. The system may, therefore, also comprise a computer-readable medium having a computer-readable executable code stored therein, wherein the computer-readable executable code is configured to instruct a processing device to display the digital image on a video device, and wherein the computer-readable executable code is further configured to assist a user with the creation of the digital representation of the texture design.

BRIEF DESCRIPTION OF THE SEVERAL VIEWS OF THE DRAWINGS

Having thus described embodiments of the invention in general terms, reference will now be made to the accompanying drawings, which are not necessarily draw to scale, and wherein:

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Although the background section refers primarily to low pressure laminates, embodiments of the present invention may be used during the creation of press plates for low pressure laminates, high pressure laminates, and/or other laminates. Furthermore, although embodiments of the present invention are generally described herein as being used to create press plates and texture designs for an "upper" surface of a laminate, embodiments of the present invention can be similarly used to create press plates and texture designs for the "lower" surface of a laminate or any other surface of a laminate, as will be apparent to one of ordinary skill in the art in view of this disclosure. Likewise, the press plates described herein may be installed in a press as "upper" press plates, "lower" press plates, and/or any other type of press plates, as will be apparent to one of ordinary skill in the art in view of this disclosure.

Figure 2:
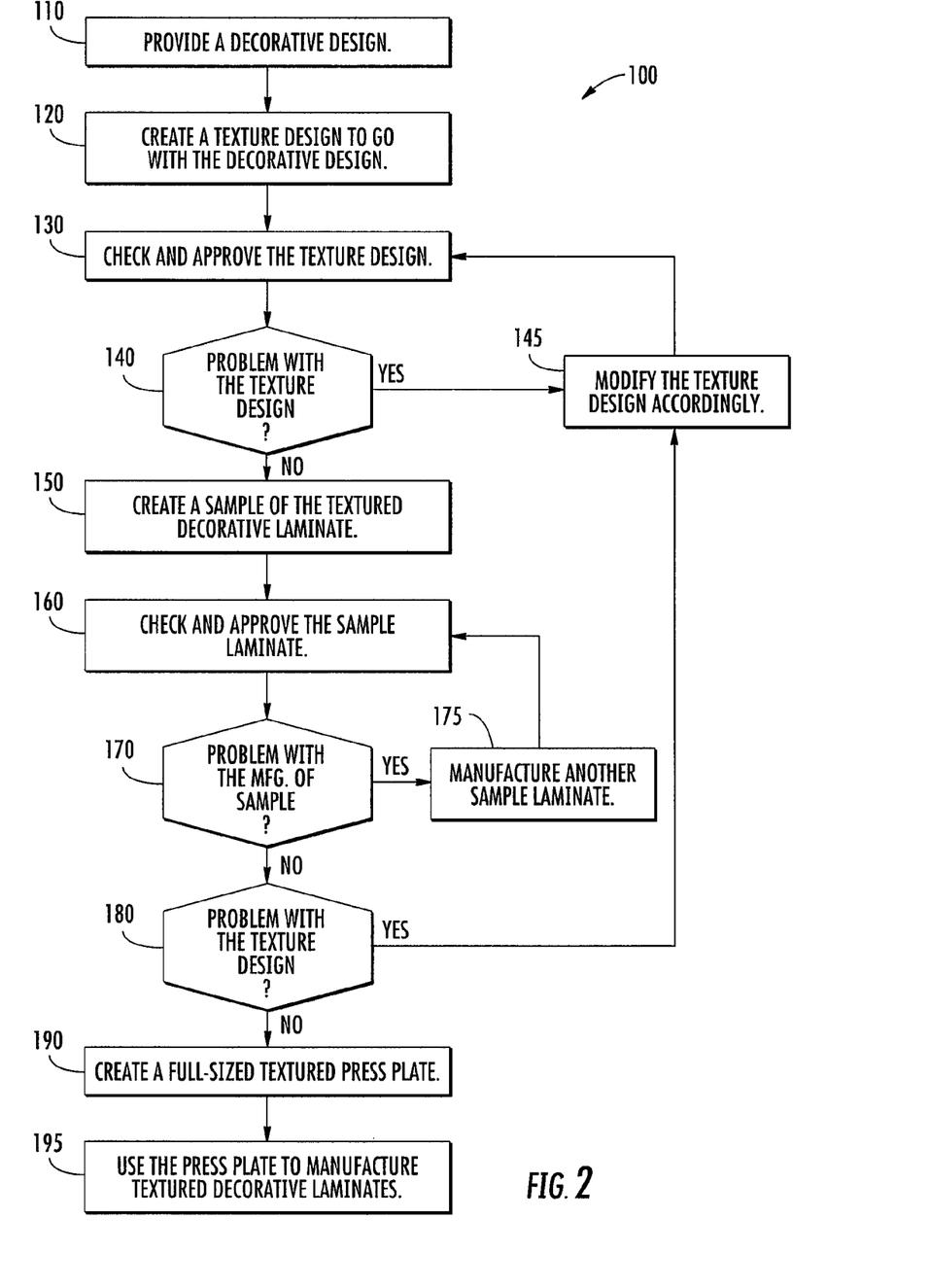
FIG. 2 is a flow chart illustrating a press plate design process, in accordance with an exemplary embodiment of the present invention.

Referring now to the figures, FIG. 2 provides a flow chart illustrating a press plate design process 100, in accordance with an exemplary embodiment of the present invention. As illustrated by blocks 110 and 120, respectively, a decorative design is provided and a texture design is created to go along with the decorative design. The decorative design determines the general appearance of the laminate and, therefore, generally comprises an aesthetically pleasing image or pattern. As described above, the decorative design may, for example, comprise an image that has the appearance of wood flooring, a tiled surface, marble, granite, concrete, brick, leather, fabric, and the like.

The "texture design" of the laminate comprises the three-dimensional design of the proposed surface of the laminate. As used herein the term "texture" is generally used to refer to three-dimensional surface formations that may include various surface textures, depressions, protrusions, ridges, troughs, other embossed features, and the like. The texture design is generally configured to work with the decorative design to create a surface that closely resembles the look and/or feel of a different surface or material that the laminate is intended to resemble. For example, where the decorative design comprises an image having the appearance of hardwood flooring, the texture design may comprise a plurality of depressions and/or ridges in the surface of the laminate that simulate the appearance and/or feel of wood grain and/or other three-dimensional features of real wood boards.

Figure 5:
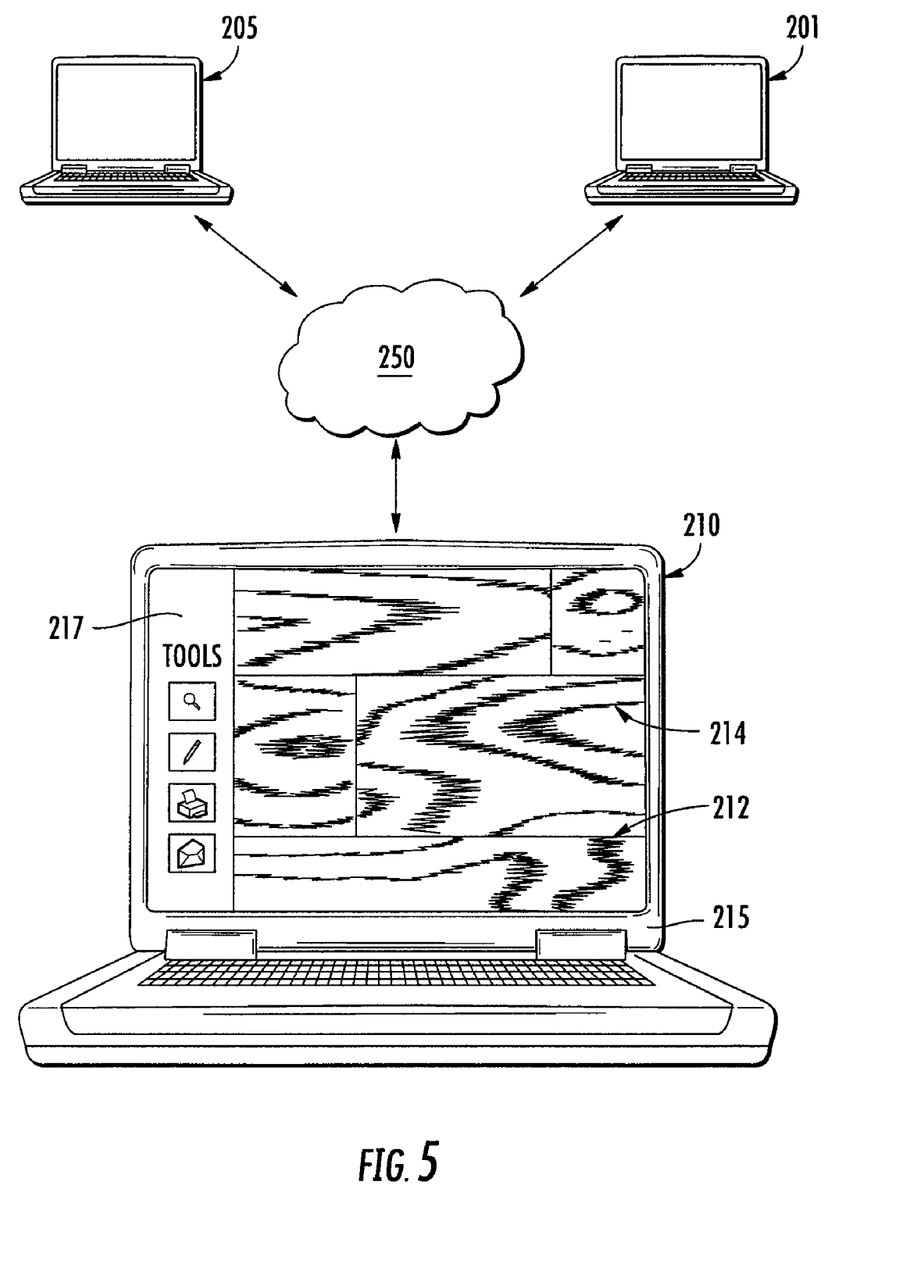
FIG. 5 illustrates using computer software and hardware to create a texture design digitally, in accordance with an exemplary embodiment of the present invention.

FIG. 5 illustrates how the decorative design may be provided and the texture design created in accordance with an exemplary embodiment of the present invention. As illustrated in FIG. 5, the process may, in some instances, involve three parties, namely a party requesting the laminate 205, a laminate manufacturer 201, and a press plate manufacturer 210. In one embodiment, the laminate manufacturer 201 provides the decorative design to the press plate manufacturer 210 along with at least loose guidelines as to what the laminate manufacture 210 or the party requiring the laminate 205 desires with regard to the laminate's surface texture. In this regard, the laminate manufacturer 201 may, for example, communicate a digital image of the decorative design to the press plate manufacturer 210 via a network 250. This digital image provided to the press plate manufacturer 210 is preferably the same digital image that the laminate manufacturer 201 will print onto the decorative paper used in the laminate.

Once the press plate manufacturer 210 receives the digital image of the decorative design along with any texture guidelines provided by the laminate manufacture 201 and/or the party requiring the laminate 205, the press plate manufacturer 210 may then use specifically-designed computer software and hardware to view the digital image of the decorative design and to digitally generate a three-dimensional texture design to go along with the decorative design. For example, as illustrated in FIG. 5, the computer software 217 may permit the press plate manufacturer 210 to view the decorative design 212 on a computer monitor 215. The computer software may further include a variety of tools 217 that allow the press plate manufacturer 210 to generate and view the texture design 214 over top of the image of the decorative design 212.

Typically, creation of the texture design requires significant experience and knowledge of not only the surface or material that the laminate is designed to emulate, but also of human perception and the manufacturing process. For example, since the design and manufacturing constraints (such as the maximum possible embossing depth) may limit the texture design, the artist creating the texture design must know how to create a natural looking surface despite the fact that it may not be possible to exactly replicate the actual three-dimensional surface of the material or surface being emulated. Furthermore, the human mind may have expectations as to how a natural surface should look and feel that are not always consistent with how the natural surface actually looks and feels. The artist creating the texture design may also have a number of variables to work with, such as the depth/height of the embossed features, different possible surface textures, the gradualness/sharpness of transitions between embossed features, the fineness and detail of the design, and the like. For all these reasons, a natural looking laminate typically does not exactly replicate the surface of the material the laminate is emulating.

As illustrated by blocks 130, 140, and 145 of the FIG. 2, once the texture design is created, the texture design may need to be checked and approved by, for example, the laminate manufacturer 201 and/or the party requesting the laminate 205. In some embodiments of the design process 100, the laminate manufacturer 201 and/or the party requesting the laminate 205 may be able to access, via for example the network 250, the software 217 and the digital decorative and texture designs to view, submit comments on, and/or modify the decorative and texture designs. In this way, the parties can go back and forth designing, modifying, and redesigning the decorative design and/or the texture design until a desirable combination is achieved. Although, as described below, it is still generally desirable to create actual sample press plates and laminates before creating full scale press plates and laminates, much of the design process can be handled virtually using computer software and hardware in this manner. In this way, significant time and cost can be eliminated from the press plate design process since the conventional press plate design process typically involved creating new sample press plates and laminates each time the design was modified and shipping each new sample to the laminate manufacturer 201 and/or the party requesting the laminate 205 for their review.

Figure 3:
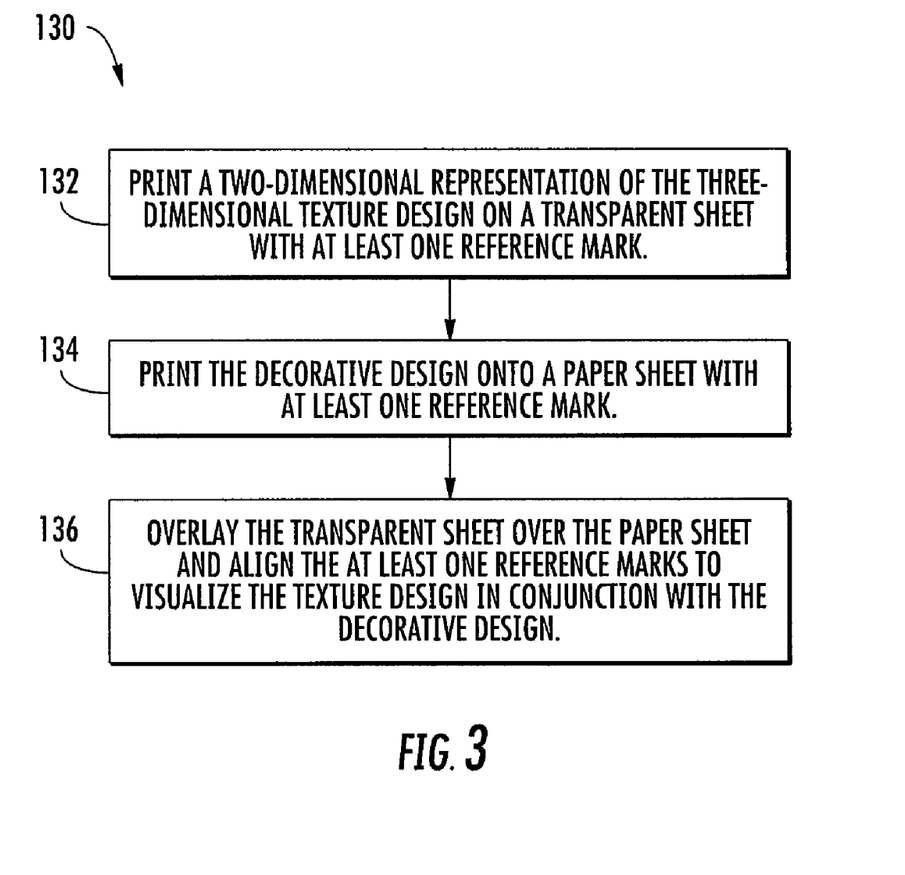
FIG. 3 is a flow chart illustrating the process of viewing and checking the texture design, in accordance with an exemplary embodiment of the present invention.
Figure 6:
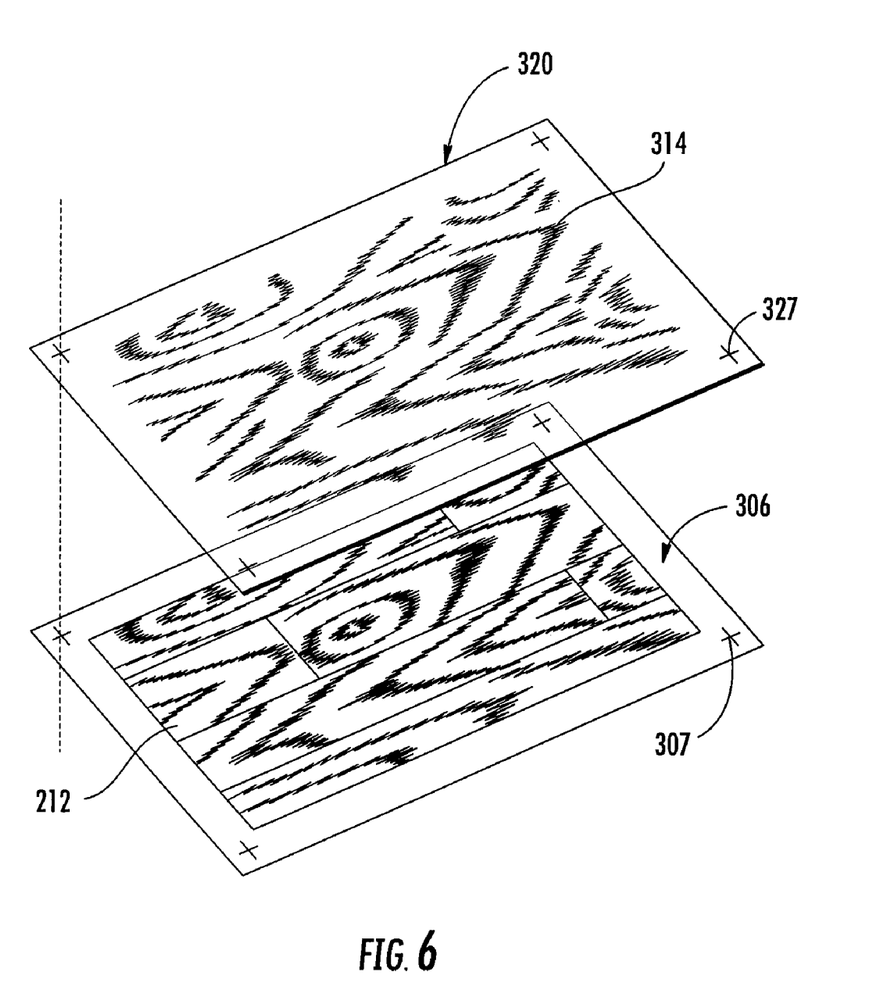
FIG. 6 illustrates using a first sheet and a second transparent sheet to view and check the texture design in the manner described in FIG. 3, in accordance with an embodiment of the present invention.

However, in addition to or as an alternative to checking the texture design 214 virtually on a computer, embodiments of the present invention also provide another technique that allows the parties to easily, economically, and accurately examine the texture design 214 and determine whether the texture design 214 will likely work well with the decorative design 212. FIGS. 3 and 6 illustrate an embodiment of such a technique in accordance with an embodiment of the present invention. As described in block 132 of FIG. 3 and as illustrated in FIG. 6, a two-dimensional representation 314 of the three-dimensional texture design is printed onto a transparent sheet 320, such as a cellulose acetate film or the like. As used herein, the phrase "transparent sheet" includes transparent, semi-transparent, translucent, and other substantially or generally transparent sheets, films, plates, and the like. In addition to being generally transparent, the overlay is also preferably made of a material that holds its shape well in terms of the length and width of overlay, such as an acetate film. Preferably, the two-dimensional representation 314 of the texture design is printed using the digital data of the three-dimensional texture design 214 that will ultimately be used to generate the press plate.

As described in block 134 of FIG. 3 and as also illustrated in FIG. 6, the decorative design 212 is printed onto another sheet 306 (i.e., "the decorative sheet"), such as a paper sheet or the like. Preferably, the decorative design 212 is printed using the digital data of the decorative design 212 that will be printed onto the laminate's decorative. The decorative design 212 and the two-dimensional representation of the texture design 314 are printed in the same scale as each other so that the transparent sheet 320 can be laid over the decorative sheet 306 (as described by block 136 of FIG. 3), thereby providing the viewer with a relatively easy, quick, accurate, and economical way to examine the texture design 214 in conjunction with the decorative design 212. In the illustrated embodiment, reference marks 327 and 307, such as crosshairs, are printed onto the transparent sheet 320 and the decorative sheet 306, respectively, so that a viewer can align the two sheets by aligning the reference marks 327 and 307.

It should be appreciated that this technique for viewing and checking the texture design 214 may save significant time and money during the design process compared to traditional techniques. For example, each time a change is made to the texture design 214, the press plate manufacturer 210 may be able to quickly print a transparent sheet 320 and a decorative sheet 306, roll the sheets up, and ship them to the laminate manufacturer 201 and/or the party requiring the laminate 205 for their review. If the two sheets 320 and 306 are printed to scale, the parties can view the sheets 320 and 306 from a distance at which the final laminates will usually be viewed to determine how different textures may appear at the usual viewing distance and what level of detail in the texture may be necessary to achieve a desired effect. Furthermore, the sheets 320 and 306 can be used to determine what types of tolerances may be allowable during manufacturing of the press plate and/or the laminates to ensure a certain level of quality in the laminates appearance. For example, a viewer can shift the transparent sheet 320 relative to the decorative sheet 306 slightly in different directions to determine how far in each direction the texture design 214 can be out of register with the decorative design 212 before the appearance of the laminate significantly degrades.

In some embodiments of the present invention, the two-dimensional representation 314 of the texture design printed on the transparent sheet 320 is printed using different colors or shades of color that identify different features of the texture design. For example, since the transparent sheet 320 must provide a two-dimensional representation of a three-dimensional surface design, certain features of the texture design may not be easily visible using a single color. In this regard, different colors and/or shades of color may indicate variations in the third un-represented dimension of the texture design, such as elevation changes in the three-dimensional texture design. For example, the two-dimensional representation of the texture design may be printed onto the transparent sheet in blue, and increasingly darker shades of blue may be used for increasingly deeper depressions in the proposed three-dimensional surface (note that depressions in the laminate surface correspond to protrusions in the press plate, and vice versa).

In another exemplary embodiment, different colors and/or shades of color printed on the transparent sheet may indicate areas in the texture design where different textures are used, since, in some embodiments, different surface textures may be used at different places in the texture design. Such variations in texture may not be easily viewable in a two-dimensional print-out. For example, as described above, a laminate may be designed so that it will have an appearance of a tiled surface having smooth ceramic tiles separated by grout lines. In such an embodiment, in addition to depressing the laminate surface where there are grout line images relative to the elevation of the laminate surface where there are tile images, it may also be desirable for the laminate surface to have a rough texture where there are grout line images and a smoother texture where there are tile images. Minor variations in the surface roughness may not be visible in a two-dimensional printout of the surface, but can be identified using different colors and/or shades of color in a two-dimensional printout.

Figure 4:
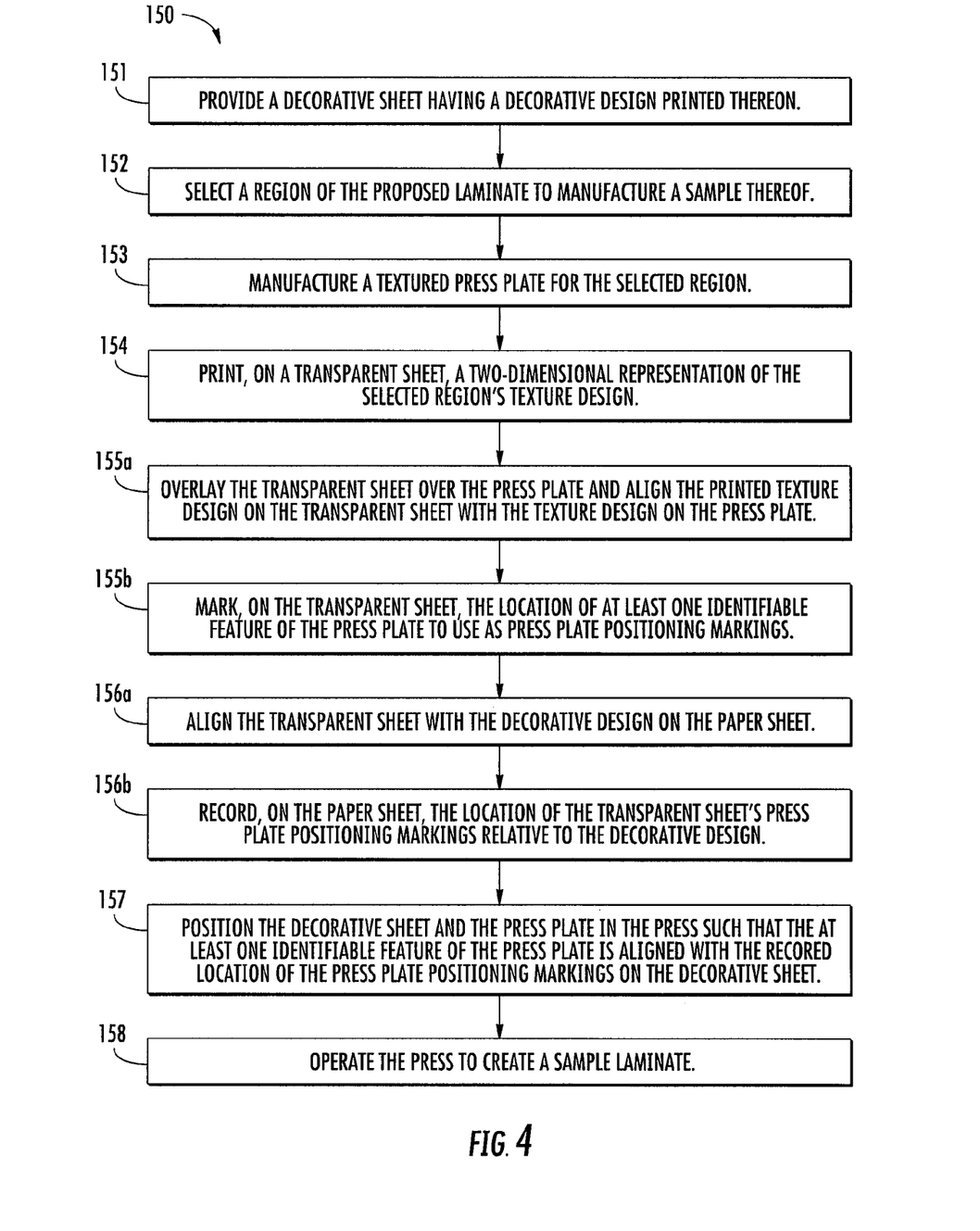
FIG. 4 is a flow chart illustrating the process of creating a sample textured decorative laminate, in accordance with an embodiment of the present invention.

Returning to FIG. 2, once the decorative design 212 and the corresponding texture design 214 are created and are at least initially approved, it may be desirable to create a sample press plate and sample laminate, as represented by block 150 of FIG. 2. FIG. 4 provides a flow chart that illustrates a process 150 of creating a sample textured decorative laminate, in accordance with an embodiment of the present invention. FIGS. 7a through 7f illustrate an embodiment of the process described in FIG. 4.

As described by block 151 of FIG. 4, a decorative sheet having a decorative design printed thereon is provided. This decorative sheet is typically a sheet of paper and is to be used as the decorative layer in the sample laminate. The decorative design may be printed on the decorative sheet by the press plate manufacturer using, for example, the digital image of the decorative data provided by the laminate manufacturer. In other embodiments, the laminate manufacturer may provide the decorative sheet to use in the sample laminate. As described in block 152, in some embodiments, only a portion of the proposed decorative laminate is selected for the sample so that a full scale press plate does not have to be made each time a new sample is to be created.

Figure 7A:
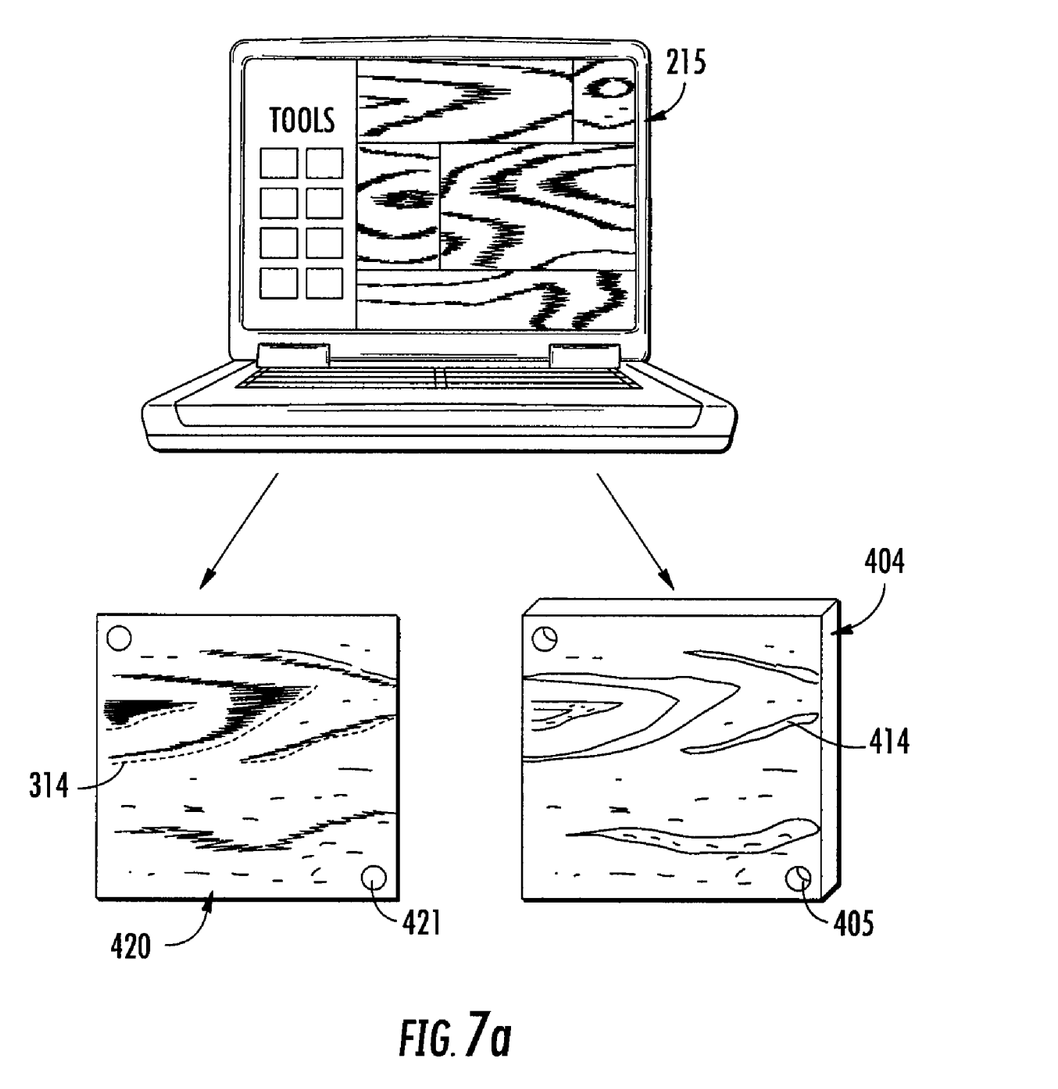
FIGS. 7a through 7f illustrate the process of making a sample textured decorative laminate in the manner described in FIG. 4, in accordance with an embodiment of the present invention.
Figure 7B:
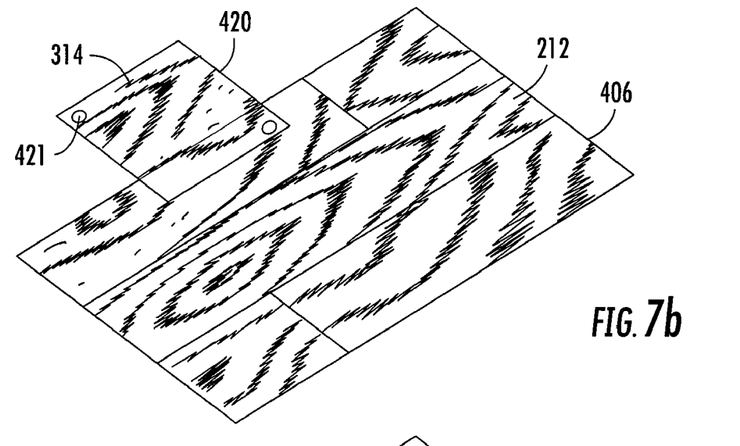

As described in blocks 153 and 154 of FIG. 4 and as illustrated in FIG. 7a, the a sample press plate 404 is manufactured and a transparent sheet 420 is printed. More particularly, a sample press plate 404 is created with a textured, three-dimensional surface 414 that is the negative of the three-dimensional texture design. In this way, when the press plate 404 is used in the press and the resin of the laminate cures around the protrusions and/or depressions in the three-dimensional surface 414 of the press plate 404, the resulting surface of the laminate will resemble the three-dimensional texture design. As described above, typically only a select portion of the laminate is manufactured for the sample. As such, the sample press plate 404 may be significantly smaller than the typical full sized press plate. For example, the sample press plate 404 may be only on the order of one square foot, while the actual final press plate may be much larger.

The press plate is typically made of a metallic material, such as stainless steel. More particularly, the press plate may be comprised of, for example, 630 or 410-grade hardened stainless steel. In general, creation of a press plate may involve first precision grinding a stainless steel plate to ensure the flatness thereof. The plate is then engraved or otherwise etched to create a three-dimensional surface based on, for example, the digital data for the three-dimensional texture design. The etching of the press plate can be accomplished by any of a variety of etching techniques that will be apparent to a person skilled in the art. For example, the etching may involve chemical etching. In some instances, etching will also require printing an image of the texture design onto the steel plate to guide the etching process. Such printing may be based on the digital data for the three-dimensional texture design. Chemical etching and other processes for etching three-dimensional patterns into metallic plates are generally well-known in the art. In some embodiments, one or more of steps of a typical known press plate manufacturing process may be modified or eliminated during the creation of the sample press plate since one or more of the steps may not be considered necessary or may be accomplished by other techniques in view of the fact that the sample press plate is typically small in size and may only be used once or twice to create sample laminates.

In some embodiments, one or more holes 405 are drilled, punched, or otherwise formed into the press plate 404. Such holes may be used to secure the press plate to the press and, as described below, in some embodiments these holes 405 are used to help register the press plate 404 with the laminate's decorative layer during the pressing procedure. These holes 405 are typically placed proximate to the outside edge of the press plate 404 so that they do not interfere unnecessarily with the three-dimensional design 414 in the surface of the press plate 404. In the exemplary embodiment illustrated in FIG. 7a, the press plate 404 is generally rectangular in shape and two holes 405 are made in the press plate 404. One of the two holes is placed in a first corner of the rectangular plate 404 and the other of the two holes is placed in a second diagonally opposing corner of the rectangular plate 404. In other embodiments, four holes may be made, one in each corner of the plate 404.

As described in block 154 of FIG. 4, a two-dimensional representation 314 of the three-dimensional texture design is printed onto the transparent sheet 420, which may, for example, be a cellulose acetate film. As described above, in some embodiments the two-dimensional representation 314 of the three-dimensional texture design is printed on the transparent sheet 420 using different colors and/or shades of color to represent different textures, elevations, and/or other features of the three-dimensional texture design. As illustrated in FIG. 7a, preferably the three-dimensional surface 414 of the press plate 404 and the two-dimensional representation 314 of the texture design are created using the same digital texture design data that will be used to create the full-sized press plate. As described above, such data may, for example, be stored in a computer 215 of the press plate manufacturer 210.

As described in block 155a, the transparent sheet 420 is then positioned over the sample press plate 404 such that the two-dimensional representation 314 of the texture design is aligned with the three-dimensional surface 414 of the sample press plate 404 (which is a negative of the texture design). As described in block 155b, once the transparent sheet 420 and the sample press plate 404 are aligned, the location of at least one identifiable feature of the press plate 404 is marked onto the transparent sheet 420 to use as "press plate positioning markings" 421 which, as described below, will aid in the registration of the press plate 404 and the laminate's decorative layer. For example, in the exemplary embodiment illustrated in FIG. 7a, the press plate 404 has two holes 405 positioned in opposite corners of the plate 404. In one embodiment, when the transparent sheet 420 is properly aligned with the press plate 404, the location of the holes is marked onto the transparent sheet by, for example, drawing corresponding circles 421 onto the transparent sheet 420, punching corresponding holes into the transparent sheet 420, and/or otherwise marking the location of the center of or the circumference of the holes 405 relative to the texture design.

In other embodiments of the present invention, other identifiable features of the press plate 404 may be marked onto the transparent sheet 420 in addition to or as an alternative to marking the location of one or more holes 405 in the press plate 404. For example, in some embodiments of the present invention, the location of one or more of the press plate's corners or edges are recorded onto the transparent sheet 420 as press plate positioning markings.

In still other embodiments, instead of steps 155a and 155b, two identifiable features of the sample press plate 404 are printed onto the transparent sheet 420 in step 154. For example, in one embodiment the locations of the holes 405 in the press plate 404 are determined on the computer 215 prior to manufacturing the sample press plate 404 and prior to printing on the transparent sheet 420. In such an embodiment, the locations of the holes 405 that are manufactured into the press plate 404 are printed onto the transparent sheet 420 when the two-dimensional representation 314 of the texture design is printed onto the transparent sheet 420.

After press plate positioning markings 421 are recorded onto the transparent sheet 420, the transparent sheet 420 is positioned over the laminate's decorative paper layer 406 such that the two-dimensional representation 314 of the texture design printed onto the transparent sheet 420 is properly aligned as desired with the decorative design 212 printed onto the decorative layer 406. This process is described in block 156a of FIG. 4 and illustrated in FIGS. 7b and 7c.

Figure 7C:
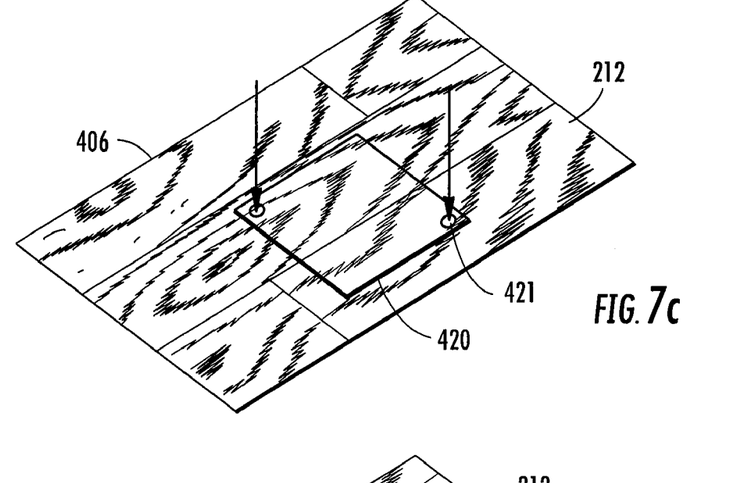
Figure 7D:
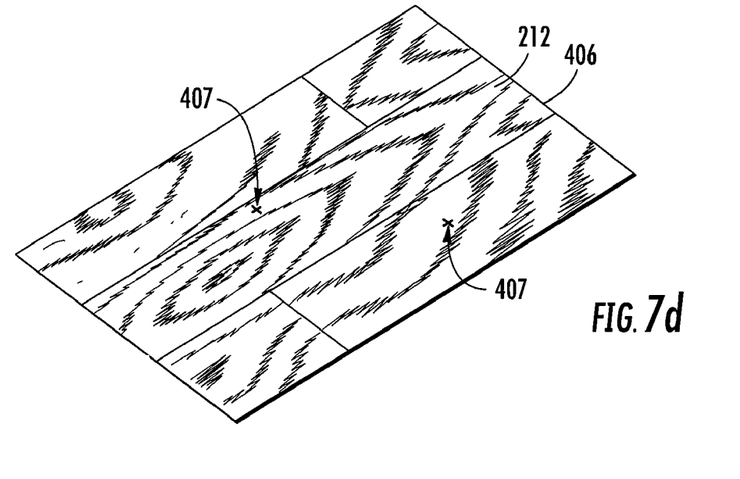

As described in block 156b of FIG. 4 and as illustrated in FIGS. 7c and 7d, once the transparent sheet 420 is properly aligned with the decorative layer 406, the locations of the transparent sheet's press plate positioning markings 421 are recorded relative to the decorative layer. For example, in the exemplary embodiment illustrated in FIG. 7, the press-plate positioning markings comprise two circles 421 that mark the location of two holes in the press plate 404 relative to the texture design. In such an embodiment, recording the location of the press plate positioning markings relative to the decorative layer may comprise drawing crosshairs 407 onto the decorative layer 406 to mark the center of the two circles 421. In another exemplary embodiment, the locations of the two circles 421 are recorded relative to the decorative layer 406 by pinpricking the decorative layer 406 to mark the centers of the two circles 421. Other techniques for recording the location of the press plate positioning markings will be apparent to one of ordinary skill in the art in view of this disclosure.

Figure 7E:
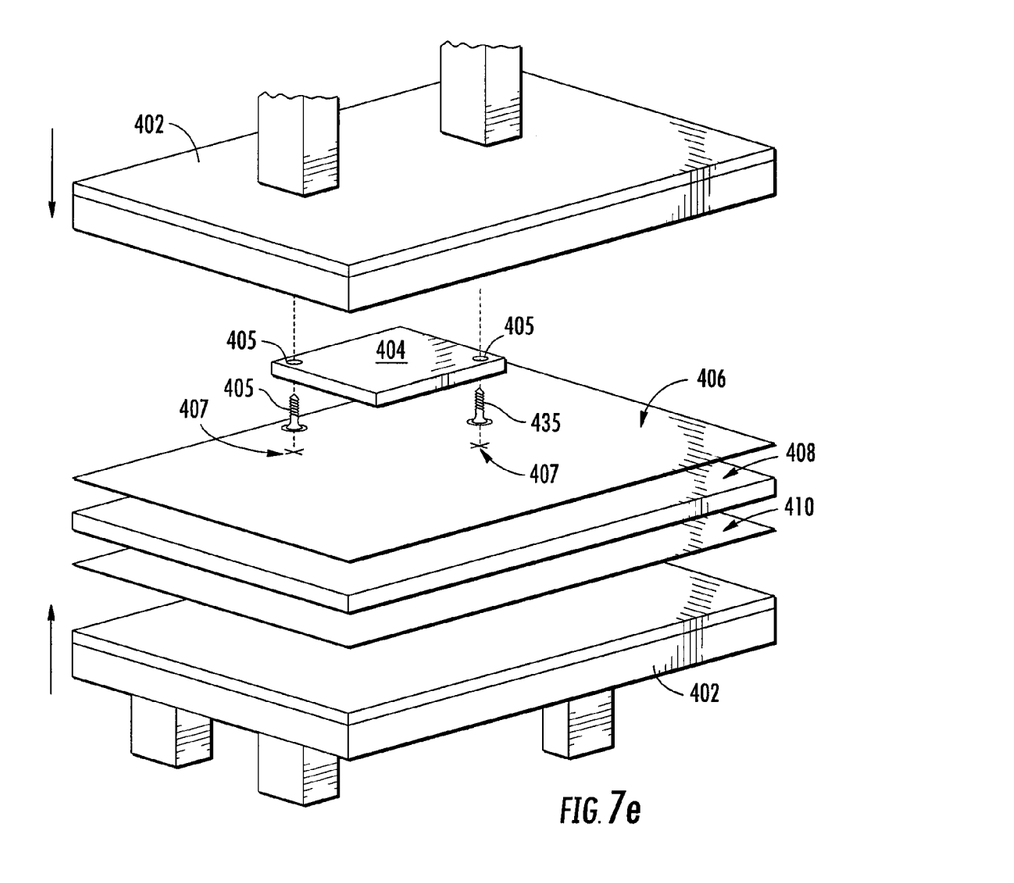

As described in block 157 of FIG. 4 and as illustrated in FIG. 7e, the laminate layers are positioned in a press 402 such that the various laminate layers are registered properly with each other and with the press plate 404. In some situations, the press 402 may not be a press configured to make the proposed full-sized laminates and may instead be a smaller laboratory press owned by the press plate manufacturer and used specifically for making laminate samples. It is important to make sure that the press plate 404 is properly registered with the decorative design on the decorative layer 406 in order to make sure that the texture design will be properly aligned with the corresponding decorative design. To ensure that the texture design is properly registered with the decorative design, the decorative layer 406 and the press plate 404 are positioned in the press 402 such that the one or more identifiable feature(s) of the press plate 404 used to make the press plate positioning markings are aligned with the recorded location of the press plate positioning markings on the decorative sheet. For example, in the illustrated embodiment, the decorative layer 406 and the press plate 404 are secured in the press 402 such that the centers of each of the two holes 405 in the press plate 404 are aligned with the intersections of the corresponding crosshairs 407 drawn onto the decorative layer 406. In an embodiment where the holes 405 in the press plate 404 are used to attach the press plate 404 to the press 402, screws 435 may be used to secure the press plate 404 to the press 402.

Figure 7F:
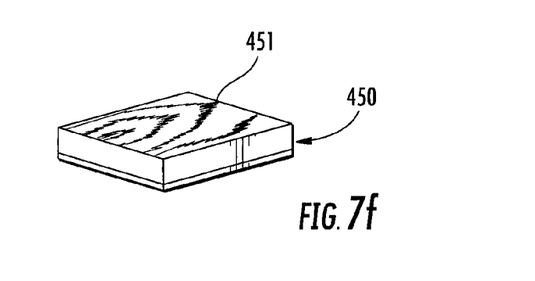

As described in block 158, once the various laminate layers and the press plate 404 are secured in the press 402 and the resin is applied as necessary, the press 402 is operated to create a sample laminate, such as the sample laminate 450 illustrated in FIG. 7f. Using the procedures described above, the three-dimensional surface 451 of the laminate sample 450 should accurately match the texture design 214 created digitally on the computer and the texture design in the surface of the laminate 450 should be precisely aligned with the decorative design in the laminate 450.

Returning to FIG. 2, blocks 16 through 180 illustrate that the sample laminate 450 is then checked by the press plate manufacturer, the laminate manufacturer, and/or the party requesting the laminate to determine if the texture design in the surface of the laminate 450 satisfies the customer. In some situations, problems with the sample 450, such as registration problems, may merely be the result of an error in the sample manufacturing process described above. As illustrated by block 175, such problems may be fixed by simply manufacturing another sample using the procedure described above. In other situations, there may be problems with the texture design. For example, the texture design in some regions of the sample may not line up with the decorative design. In other instances, the press-plate manufacturer, the laminate manufacture, and/or the customer may not be satisfied with one or more features of the texture design and/or the decorative design and may want to make some modifications. If such is the case, the texture design can be modified as needed and the process of checking the texture design and creating a sample laminate can be repeated as described above with the modified texture design and/or decorative design.

As illustrated by blocks 190 and 195, once the parties approve a sample, the press plate manufacturer can create a full-sized textured press plate and the laminate manufacturer can use the press plate to make one or more textured decorative laminates. Co-pending U.S. patent application Ser. No. 11/957,074, assigned to the same assignee as the present application, describes systems and methods for designing and making a press plate while accounting for the growth in the press plate and/or in the laminate layers that generally occurs during the laminating process. This co-pending patent application is incorporated herein by reference.

It should be appreciated that, although the written description and the figures of the present application describe the steps of the various procedures in a particular order, a person having ordinary skill in the art will understand, in view of this disclosure, that these are merely exemplary embodiments and that, in some instances, some of the procedures can be practiced with some variations in the order of steps and that some of the steps may be combined with other steps.

Furthermore, although the procedure described in FIG. 4 is generally described herein as being a procedure for manufacturing of a sample laminate, the same procedure or a similar procedure may be used to align the press plate and the decorative layer when producing final full scale laminates. However, typically during full scale production of full-sized laminates, registration marks printed onto the decorative layer are used to align the decorative layer with the press plate in the press. For example, during full production of the laminates, a press may be configured to automatically read these registration marks on the decorative layer and to position the decorative layer in the press in proper registration with the press plate fixed in the press. Sample laminates, however, typically involve only a portion of the proposed laminate and may be made on a smaller "lab" press. As such, standard registration marks used in full scale laminate production are typically not used or useful when manufacturing samples.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:
1. A method of creating a textured decorative laminate, the method comprising:
  providing a decorative sheet having a decorative design printed thereon;
  providing a digital image of the decorative design;
  using the digital image of the decorative design to create a texture design digitally;
  providing a press plate having a three-dimensional surface, the three-dimensional surface comprising a plurality of depressions and/or protrusions arranged in accordance with the texture design, wherein the press plate has at least one identifiable feature;
  providing a transparent sheet having the texture design printed thereon in two-dimensions, wherein the transparent sheet has press plate positioning markings thereon showing the location of the at least one identifiable feature of the press plate relative to the texture design, wherein the digital texture design is used to generate the two-dimensional image on the transparent sheet;

positioning the transparent sheet over the decorative sheet such that the texture design printed on the transparent sheet aligns with the decorative design on the decorative sheet as desired;

recording relative to the decorative sheet, while the transparent sheet is positioned as desired over the decorative sheet, the location of the press plate positioning markings of the transparent sheet;

removing the transparent sheet from its position over the decorative sheet;

following removal of the transparent sheet from its position over the decorative sheet, providing resin on and/or around the decorative sheet; and pressing the press plate against the resin and the decorative sheet such that the at least one identifiable feature of the press plate aligns with the recorded location of the press plate positioning markings relative to the decorative sheet.

2. The method of claim 1, wherein providing a decorative sheet having a decorative design printed thereon comprises: printing a decorative design on a sheet of paper.

3. The method of claim 1, wherein the decorative design comprises an image of a wood, ceramic, tile, stone, or brick surface, and wherein the texture design comprises a texture indicative of the wood, ceramic, tile, stone, or brick surface.

4. The method of claim 1, wherein providing a transparent sheet having the texture design comprises:
printing the two-dimensional image of the texture design onto a sheet of acetate.

5. The method of claim 1, wherein the at least one identifiable feature of the press plate comprises at least two circular holes in the press plate located proximate to opposite corners of the press plate.

6. The method of claim 5, wherein the at least two circular holes in the press plate are used to attach the press plate to a press.

7. The method of claim 5, wherein the press plate positioning markings on the transparent sheet comprise markings indicating the location of the centers of each of the at least two circular holes in the press plate relative to the texture design.

8. The method of claim 7, wherein recording the location of the press plate positioning markings relative to the decorative sheet comprises creating markings on the decorative sheet that show the location of the markings on the transparent sheet showing the center of the at least two circular holes.

9. The method of claim 8, further comprising:
aligning the centers of the at least two circular holes in the press plate with the markings on the decorative sheet showing the center of the at least two circular holes.

10. The method of claim 1, wherein recording the location of the press plate positioning markings relative to the decorative sheet comprises creating markings on the decorative sheet that show the location of the press plate positioning markings when the transparent sheet is positioned as desired over the decorative sheet.

11. The method of claim 1, wherein pressing the press plate against the resin and the decorative sheet comprises pressing the press plate against the resin, the decorative sheet, and a rigid substrate material to form a low-pressure decorative laminate board.

12. The method of claim 1, wherein the method comprises a method of making a textured laminate sample, and wherein the press plate is a sample press plate and covers only a portion of the decorative design.

13. The method of claim 12, wherein the textured laminate sample comprises only a portion of the entire decorative design.

14. The method of claim 13, wherein the textured laminate sample is formed prior to manufacturing of a full scale press plate for use in making full scale decorative laminates.

15. The method of claim 12, further comprising:
analyzing the textured laminate sample to determine if the sample meets the desired characteristics, wherein, in the event the sample is unsatisfactory, modifying the sample press plate or producing a new sample press plate with a modified texture design.

16. The method of claim 1, wherein the texture design printed on the transparent sheet comprises different colors or different shades of a color to represent different textures used in the three-dimensional texture design.

17. The method of claim 1, wherein the texture design printed on the transparent sheet comprises different colors or different shades of color to represent variations in the third dimension of the three-dimensional texture design.

18. The method of claim 1, wherein the decorative design comprises a wood grain image, and wherein the texture design comprises a representation of wood grain texture.

19. The method of claim 1, wherein the decorative design comprises an image of a tiled surface, and wherein the texture design comprises one or more grout line representations depressed relative to one or more tile representations.

20. A method of creating a textured decorative laminate, the method comprising:
providing a decorative sheet having a decorative design printed thereon;

providing a press plate having a three-dimensional surface, the three-dimensional surface comprising a plurality of depressions and/or protrusions arranged in a predetermined texture design, wherein the press plate has at least one identifiable feature;

providing a transparent sheet having the predetermined texture design printed thereon in two-dimensions, wherein the texture design printed on the transparent sheet comprises different colors or different shades of a color to represent different textures used in the three-dimensional texture design, wherein the transparent sheet has press plate positioning markings thereon showing the location of the at least one identifiable feature of the press plate relative to the predetermined texture design;

positioning the transparent sheet over the decorative sheet such that the predetermined texture design printed on the transparent sheet aligns with the decorative design on the decorative sheet as desired;

recording relative to the decorative sheet, while the transparent sheet is positioned as desired over the decorative sheet, the location of the press plate positioning markings of the transparent sheet;

removing the transparent sheet from its position over the decorative sheet;

following removal of the transparent sheet from its position over the decorative sheet, providing resin on and/or around the decorative sheet; and pressing the press plate against the resin and the decorative sheet such that the at least one identifiable feature of the press plate aligns with the recorded location of the press plate positioning markings relative to the decorative sheet.

21. A method of creating a textured decorative laminate, the method comprising:
providing a decorative sheet having a decorative design printed thereon;

providing a press plate having a three-dimensional surface, the three-dimensional surface comprising a plurality of depressions and/or protrusions arranged in a predetermined texture design, wherein the press plate has at least one identifiable feature;

providing a transparent sheet having the predetermined texture design printed thereon in two-dimensions, wherein the texture design printed on the transparent sheet comprises different colors or different shades of color to represent variations in the third dimension of the three-dimensional texture design, wherein the transparent sheet has press plate positioning markings thereon showing the location of the at least one identifiable feature of the press plate relative to the predetermined texture design;

positioning the transparent sheet over the decorative sheet such that the predetermined texture design printed on the transparent sheet aligns with the decorative design on the decorative sheet as desired;

recording relative to the decorative sheet, while the transparent sheet is positioned as desired over the decorative sheet, the location of the press plate positioning markings of the transparent sheet;

removing the transparent sheet from its position over the decorative sheet;

following removal of the transparent sheet from its position over the decorative sheet, providing resin on and/or around the decorative sheet; and pressing the press plate against the resin and the decorative sheet such that the at least one identifiable feature of the press plate aligns with the recorded location of the press plate positioning markings relative to the decorative sheet.

22. The method of claim 21, further comprising:
providing a digital image of the decorative design;
using the digital image of the decorative design to create the predetermined texture design digitally; and
using the digital predetermined texture design to generate the three-dimensional surface of the press plate and the two-dimensional image on the transparent sheet.

23. The method of claim 21, wherein the at least one identifiable feature of the press plate comprises at least two circular holes in the press plate located proximate to opposite corners of the press plate.

24. The method of claim 23, wherein the at least two circular holes in the press plate are used to attach the press plate to a press.

25. The method of claim 23, wherein the press plate positioning markings on the transparent sheet comprise markings indicating the location of the centers of each of the at least two circular holes in the press plate relative to the predetermined texture design.

26. The method of claim 25, wherein recording the location of the press plate positioning markings relative to the decorative sheet comprises creating markings on the decorative sheet that show the location of the markings on the transparent sheet showing the center of the at least two circular holes.

27. The method of claim 26, further comprising:
aligning the centers of the at least two circular holes in the press plate with the markings on the decorative sheet showing the center of the at least two circular holes.

28. The method of claim 21, wherein recording the location of the press plate positioning markings relative to the decorative sheet comprises creating markings on the decorative sheet that show the location of the press plate positioning markings when the transparent sheet is positioned as desired over the decorative sheet.

* * * * *